United States Patent
Bondugula et al.

(10) Patent No.: US 11,876,807 B2
(45) Date of Patent: *Jan. 16, 2024

(54) SECURE ONLINE ACCESS CONTROL TO PREVENT IDENTIFICATION INFORMATION MISUSE

(71) Applicant: EQUIFAX INC., Atlanta, GA (US)

(72) Inventors: Rajkumar Bondugula, Irving, TX (US); Piyush Patel, Peachtree City, GA (US); Samiyuru Geethanjana Senarathne Menik Hitihami Mudiyanselage, Athens, GA (US)

(73) Assignee: Equifax Inc., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/659,294

(22) Filed: Apr. 14, 2022

(65) Prior Publication Data

US 2022/0239665 A1 Jul. 28, 2022

Related U.S. Application Data

(63) Continuation of application No. 16/731,703, filed on Dec. 31, 2019, now Pat. No. 11,356,460.

(51) Int. Cl.
*H04L 9/40* (2022.01)

(52) U.S. Cl.
CPC ............ *H04L 63/108* (2013.01); *H04L 63/08* (2013.01); *H04L 63/0876* (2013.01); *H04L 63/102* (2013.01)

(58) Field of Classification Search
CPC ... H04L 63/108; H04L 63/08; H04L 63/0876; H04L 63/102; G06F 21/31; G06F 21/64; G06F 21/6218
See application file for complete search history.

(56) References Cited

U.S. PATENT DOCUMENTS 8,099,509 B2   1/2012  Kawato
11,356,460 B2  6/2022  Bondugula et al.
(Continued)

FOREIGN PATENT DOCUMENTS

WO   2018006060 A1   1/2018
WO   2019101225 A2   5/2019

OTHER PUBLICATIONS

U.S. Appl. No. 16/731,703, "Non-Final Office Action", dated Oct. 28, 2021, 11 pages.
(Continued)

*Primary Examiner* — Khoi V Le
(74) *Attorney, Agent, or Firm* — Kilpatrick Townsend & Stockton LLP

(57) ABSTRACT

In some aspects, a computing system can control access of a user computing device to a resource. The computing system can obtain an access request submitted by a user computing device. The computing system can verify permission information in the access request to determine that the access request is valid. If the access request is valid, the computing system submits an authentication request to request an authentication system to authenticate the user and obtains authentication results generated by the authentication system. The computing system further provides, based on the authentication results, an access control decision for the access request.

20 Claims, 6 Drawing Sheets

(56) References Cited

U.S. PATENT DOCUMENTS

| | | | | | |
|---|---|---|---|---|---|
| 2007/0220604 | A1* | 9/2007 | Long | ............ | G06F 21/55 726/22 |
| 2010/0071059 | A1* | 3/2010 | Urasawa | ............ | G06F 21/84 726/19 |
| 2012/0297450 | A1* | 11/2012 | Whittick | ............ | H04L 67/02 709/217 |
| 2013/0205374 | A1* | 8/2013 | Du | ............ | H04L 63/08 726/4 |
| 2015/0355879 | A1* | 12/2015 | Beckhardt | ............ | H04L 41/22 700/94 |
| 2016/0267738 | A1* | 9/2016 | Carstens | ............ | H04L 63/10 |
| 2019/0068367 | A1* | 2/2019 | Baughman | ............ | G06F 21/32 |

OTHER PUBLICATIONS

U.S. Appl. No. 16/731,703, "Notice of Allowance", dated Feb. 9, 2022, 12 pages.
International Application No. PCT/US2020/067170, "International Search Report and Written Opinion", dated Apr. 12, 2021, 11 pages.
U.S. Appl. No. 16/731,703, "Corrected Notice of Allowability", dated May 11, 2022, 3 pages.
Australian Patent Application No. 2020419017, "First Examination Report", dated Jul. 13, 2022, 3 pages.
Canadian Patent Application No. 3,163,404, "Office Action", dated Sep. 26, 2022, 7 pages.
PCT/US2020/067170, "International Preliminary Report on Patentability", dated Jul. 14, 2022, 8 pages.
Australian Patent Application No. 2020419017, "Second Examination Report", dated Feb. 15, 2023, 3 pages.
Canadian Patent Application No. 3,163,404, "Office Action", dated Mar. 8, 2023, 10 pages.
AU2020419017, "Notice of Acceptance", dated May 18, 2023, 3 pages.
EP20845508.9, "Office Action", dated Apr. 18, 2023, 7 pages.
Canadian Application No. CA3,163,404, "Office Action", dated Aug. 17, 2023, 10 pages.

* cited by examiner

SECURE ONLINE ACCESS CONTROL TO PREVENT IDENTIFICATION INFORMATION MISUSE

CROSS-REFERENCES TO RELATED APPLICATIONS

This application is a continuation of U.S. patent application Ser. No. 16/731,703 entitled "SECURE ONLINE ACCESS CONTROL TO PREVENT IDENTIFICATION INFORMATION MISUSE," filed Dec. 31, 2019, the entire contents of which are hereby incorporated by reference.

TECHNICAL FIELD

This disclosure relates generally to cybersecurity, and more particularly related to increasing the security of online resource access to prevent misuse of identification information.

BACKGROUND

Resource access control has become more challenging due to various resources becoming more conveniently acquired and accessed via online computing environment. The interconnectivity of online computing environments, while facilitating access for authorized users, also increases the susceptibility of an online computing environment to attacks or other unauthorized usage from hackers, malware, and other security threats. For example, a user can acquire access to an online computing environment by providing login information or other identification information. Similarly, a consumer can apply for access to a banking service, or a credit product by providing identification information and other information online. The online nature of these transactions makes it easier for individuals engaging in fraud or other unauthorized online activity to steal the identity of other individuals or entities or to use the identity information for unintended purposes. As a result, access to a resource is often granted to individuals or entities who are not entitled to the resource causing resource abuse.

SUMMARY

Various embodiments of the present disclosure provide systems and methods for providing a secure access control system to prevent identification information misuse. For instance, an access control system can obtain an access request from a user computing device. The access request includes user identification information associated with a user and permission information describing permission of use associated with the user identification information. The access control system can verify the permission information in the access request to determine that the access request is a valid request. The access control system can submit an authentication request for the authentication system to authenticate the user associated with the valid request.

The authentication system can service the authentication request by, for example, submitting authentication inquiries to the user computing device. The authentication system can generate one or more authentication results based on reference user authentication data, which is associated with the user, and one or more responses to the authentication inquiries received from the user computing device. The authentication system can submit the authentication results to the access control system. The access control system can transmit an access control decision for the access request to the user computing device. The access control decision can control the user computing device's access to the resource (e.g., by granting or denying access).

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim. The foregoing, together with other features and examples, will become more apparent upon referring to the following specification, claims, and accompanying drawings.

DETAILED DESCRIPTION

Figure 1:
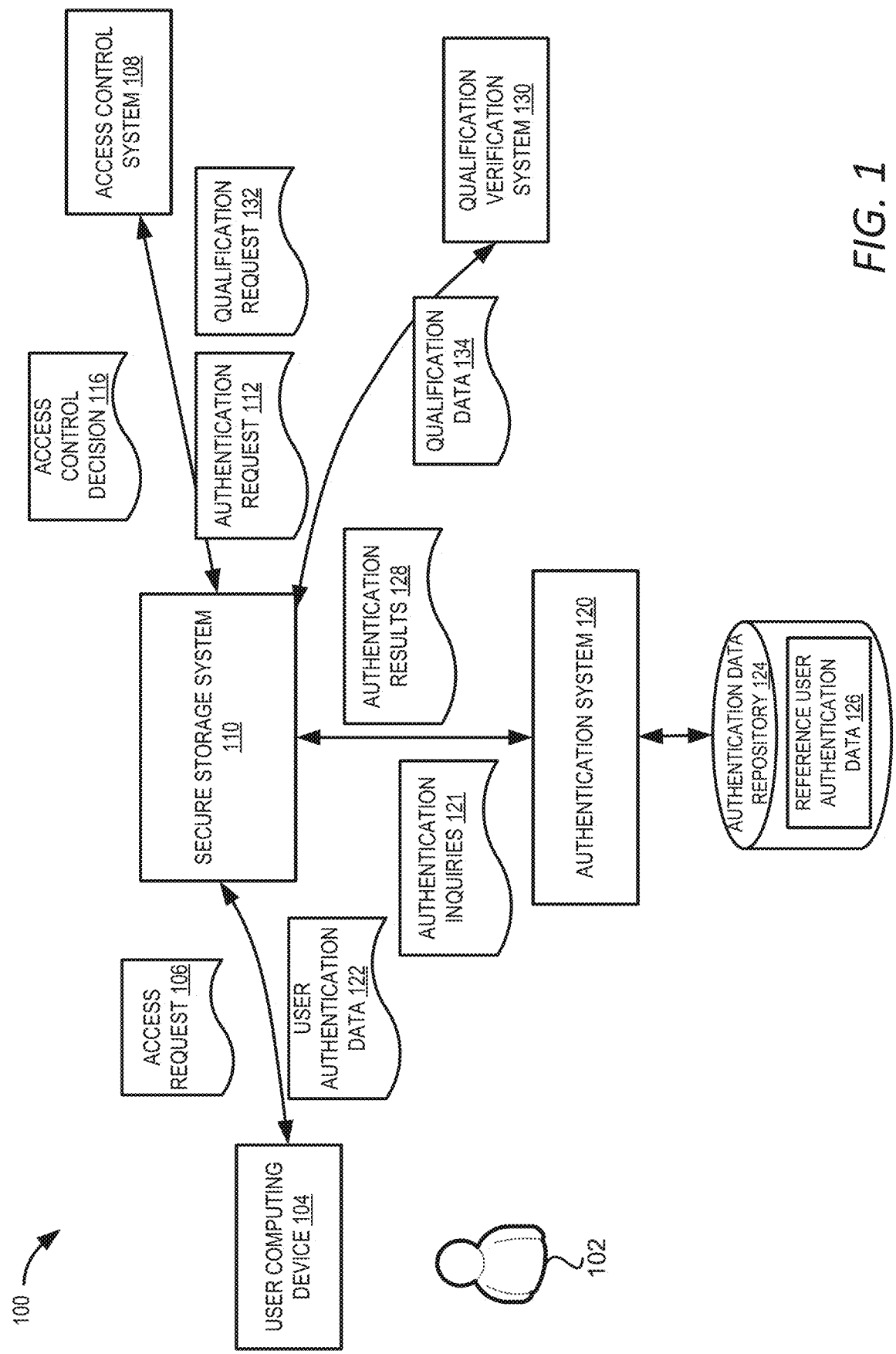
FIG. 1 is a block diagram depicting an example of an operating environment for securely controlling access to resources and preventing identification information misuse, according to certain aspects of the present disclosure.

Certain aspects and features of the present disclosure involve providing a secure access control mechanism to prevent identification information misuse. As described herein, certain aspects provide improvements to resource access control by requiring auxiliary information in addition to the user identification information to determine whether to grant or deny an access request for a user. This renders the user identification information alone insufficient to gain access to resources and thus helps to prevent misuse of the user identification information and thus increases the security of the resource access control system.

In some examples, the auxiliary information includes permission information and authentication information. The permission information specifies the permission of use of the user identification information and includes, for example, the intended recipient of the user identification information, the intended purpose for using the user identification information, the valid time period, the valid channel of receiving the user identification information, and so on. The authentication information specifies the authenticity of the user who requested access. As such, satisfaction of the various criteria specified in the permission information and the authentication information can be required for the user identification information to be utilized in an access control decision by an access control system.

Certain aspects described herein provide improvements to the security of online computing environments by, for example, providing a robust authentication system that reduces an unauthorized user's ability to leverage the anonymity of an online computing environment to access resources from that online computing environment. For instance, while online computing environments offer users ease and efficiency in exchanging information, the interoperability and sophisticated integration of technology that make these online computing environments such valuable assets also make them vulnerable to attack. In conventional online computing environments, it is assumed, without verification, that the user requesting access to resources provided by the online computing environments is the true owner of the user identification information he or she has provided. As such, access to resources are often granted to individuals or entities who are not entitled to the resource causing resource abuse. By contrast, certain aspects described herein can address these weaknesses in conventional online computing environments by, for example, involving an authentication system to examine the authenticity of the requesting user to ensure the user is the true owner of the user identification information, and further including permission information in the request so that the user identification information cannot be used by other individuals or entities or for different purposes. In addition, a secure storage system is employed to ensure the interactions between the various systems are recorded and traceable which allows transactions to be performed between trustless parties. Thus, these aspects can improve the functionality of computing environments by increasing the network security of these environments.

Operating Environment Example for Secure Resource Management System

FIG. 1 is a block diagram depicting an example of an access control environment 100 for securely controlling access to resources and preventing identification information misuse, according to certain aspects of the present disclosure. The operating environment 100 includes a user computing device 104, an access control system 108, an authentication system 120, and a secure storage system 110.

The user computing device 104 is configured to generate and submit an access request 106 for a user 102 to request access to resources including products or services, such as an online computing environment, an online banking service, a credit product, and so on. The access request 106 includes user identification information of the user 102 that uniquely identifies the user, such as the name, address, date of birth, social security number, driver's license number of the users, and others. The access request 106 further includes permission information that specifies the use permissions of the user identification information. The permission information can include, but is not limited to, the intended recipient and the intended purpose of the user identification information, the valid time period during which the user identification information can be used, the maximum number of times that the user identification information can be used, the valid channel where the user identification information can be received, and so on.

In some examples, the access request 106 is sent to the access control system 108 directly. In other examples, the access request 106 is submitted to the secure storage system 110. The secure storage system 110 stores information associated with the access control environment 100 so that the interactions or transactions between the systems in the access control environment 100 are recorded and can be traced back when needed. In some examples, the secure storage system 110 is implemented using a blockchain. Using the blockchain allows the transaction to be performed between trustless parties. For example, due to the risk of identity fraud, the user 102 cannot be trusted because he or she may be impersonating another user. The access control system 108 cannot be trusted due to reasons, such as information abuse. Those transactions that cannot be traced or verified by the blockchain can be terminated and discarded thereby eliminating fraudulent transactions.

In some aspects, the secure storage system 110 can be implemented using a hybrid blockchain including a private blockchain that is only accessible by the access control system 108 and a public blockchain accessible by the public. The secure storage system 110 can store the detailed and sensitive information in the private blockchain, such as the user identification data contained in the access request 106. The secure storage system 110 can store an encrypted version of the data in the secure storage system 110 on the public blockchain. The encrypted version can include the hash of each of the transaction data. In other aspects, the secure storage system 110 can be implemented using a public blockchain where the data in the secure storage system 110 are encrypted and stored in the public blockchain. As a result, the transaction data are publicly available, but the content of the data is not accessible without the decryption key and thus remains protected in the public blockchain.

The access control system 108 can receive or otherwise obtain the access request 106 submitted by the user computing device 104. For example, if the access request 106 is submitted to the secure storage system 110, the access control system 108 checks the secure storage system 110 for new access requests from time to time. The access control system 108 can determine that an access request 106 is intended for it by examining the permission information contained therein.

If the permission information lists the entity associated with the access control system 108 as an intended recipient, then the access control system 108 may determine that the access request 106 is intended for it. In addition, the access control system 108 can also determine whether the access request 106 is for the purpose that the access request 106 is requesting for. For example, if the permission information indicates that the intended purpose is for a credit card application, but the access request 106 request for opening a bank account, the access control system 108 may determine that the access request 106 is not valid request.

Further, the access control system 108 can also determine that the access request 106 is received through a valid channel within the specified time period. For example, the permission information may specify that the valid channel of the access request 106 should be an online application through a webpage hosted by the access control system 108. In this example, if the access request 106 is received through an application executed on the user computing device 104, the access control system 108 may determine that the access request 106 is an invalid request. The access control system 108 may accept, based on one or more of these determinations, the access request 106 and make an access decision based on the access request 106. Otherwise, the access control system 108 discards the access request 106. For instance, the access control system 108 could discard the access request 106 if the intended purpose from the permission information does not match the purpose of the access request 106, if the access request 106 is received through an invalid channel, if the access request 106 is received outside of the specified time period, or some combination thereof.

The access control system 108 can verify the authenticity of the user 102 to determine whether to grant or deny the access request 106. In some examples, access control system 108 can verify the authenticity of the user 102 via communications with an authentication system 120. The access control system 108 can submit an authentication request 112 to the authentication system 120, either directly or via the secure storage system 110. In some examples, the authentication request 112 includes the user identification information and the permission information contained in the access request 106.

The authentication system 120 receives or otherwise obtains the authentication request 112 submitted by the access control system 108. For example, if the authentication request 112 is submitted to the secure storage system 110, the authentication system 120 checks the secure storage system 110 for new authentication requests at specified intervals. If the secure storage system 110 has a new authentication request 112, the authentication system 120 performs the authentication of the user specified in the authentication request 112.

Based on the user identification information contained in the authentication request 112, the authentication system 120 communicates with the user computing device 104 to collect user authentication data 122. In some examples, the authentication system 120 transmits one or more authentication inquiries 121 to request various user authentication data 122 from the user 102. The user authentication data 122 can include data related to the identity of the user 102, such as the biometrics of the user 102, or the locations frequently visited by the user 102. The user authentication data 122 can also include data related to devices or accounts owned by the user 102, such as the IP address of the cell phone, laptop, desktop, the Internet service provider (ISP) account or the cellular service provider account. The user authentication data 122 can further include the knowledge of the user 102, such as a picture pass selected by the user 102 or an answer to a secret question.

The collected user authentication data 122 is then compared with reference user authentication data 126 stored in an authentication data repository 124 to determine if there is a match. A match can be found if the collected user authentication data 122 and the reference user authentication data 126 are consistent or the portion of the collected user authentication data 122 that are consistent with the reference user authentication data 126 is higher than a threshold. If a match is found, the authentication system 120 can determine that the user 102 is the owner of the user identification information included in the authentication request 112. Otherwise, the authentication system 120 can determine that the user 102 is not the owner of the identification information. The authentication system 120 can generate one or more authentication results 128 based on the determination. The authentication system 120 can submit the authentication results 128 to the access control system 108, either directly or via the secure storage system 110 (e.g., by storing the authentication results 128 in the secure storage system 110 at a location accessible to the access control system 108).

In some examples, the authentication system 120 is also configured to verify that the user identification information contained in the authentication request 112 is intended for the access control system 108 that submitted the authentication request 112. The verification can be performed based on the permission information contained in the authentication request 112. If the permission information specifies that the access control system 108 is the intended recipient of the user identification information, the authentication system 120 performs the authentication process to generate the authentication results 128 as described above. If the access control system 108 is not the intended recipient of the user identification information, the authentication system 120 denies the authentication request 112 and informs the access control system 108 accordingly.

In some examples, the authentication results 128 include an indication of whether the user 102 is the authentic owner of the user identification information and permission associated with the use of the authentication results 128. The permission can specify a valid time period of the authentication results 128 or a maximum number of uses of the authentication results. Based on the permission, the authentication results 128 is valid when the valid time period has not expired or the authentication results 128 have not been used for more than the maximum number of times. The valid time period or the maximum number of uses of the authentication results 128 can be set according to the permission information contained in the authentication request 112 so that, for example, the access request 106 and authentication results 128 expire at the same time. In some examples, instead of providing an indication of whether the user 102 is the authentic owner of the user identification information, the authentication system 120 includes, in the authentication results 128, the level of match between the collected user authentication data 122 and the reference user authentication data 126. The access control system 108 can determine whether to grant access to the resources based on the level of match.

The reference user authentication data 126 stored in the authentication data repository 124 can be obtained prior to the authentication process being performed. For example, the authentication system 120 can collect the reference user authentication data 126 during a registration process of the user computing device 104. The registration process allows the authentication system 120 to associate the user computing device 104 with a user profile of the user 102 and to collect reference user authentication data 126 from the registered user computing device.

For instance, a user profile can be built for a user 102 when the user visits a location associated with the authentication system 120, such as an office of a state department of motor vehicles, a branch office of a bank, and the like. During the visit, the identification information of user 102 can be manually verified by a human being using multiple forms of identification, such as the driver's license, the social security number card and other forms of identification. If the identification of the user 102 is verified, the authentication system 120 can generate the user profile for user 102 and further generates a key, such as a QR code. By using the key (e.g. scanning a printed QR code), a user computing device 104 can be associated with the user profile and provide the reference user authentication data 126 via a registration process.

The registration process can involve the authentication system 120 requesting certain types of user information from the user computing device 104 as the reference user authentication data 126, For example, the authentication system 120 can require the user computing device 104 to install an authentication application or can require that a user of the user computing device 104 must visit a website or call a service. The requested reference user authentication data 126 can include data such as the biometrics of the user 102, the locations frequently visited by the user 102, the IP address of the user computing device 104, a picture pass selected by the user 102, and other information that is related to the identity of the user 102. The reference user authentication data 126 can also include data regarding the devices or accounts owned by the user 102 and the knowledge of the user 102. The user computing device 104 prompts the user 102 to provide these types of information and send the collected user information to the authentication system 120.

In some implementations, for security reasons, the collected reference user authentication data 126 is distorted before being sent to the authentication system 120. This can avoid transmitting and storing raw reference user authentication data on the authentication system 120. The distortion function can be assigned by the authentication system 120 to the user computing device 104. In some examples, the distortion function is unique to each device, or to each device-application/web site/service combination. To further enhance the security, the authentication system 120 can assign a new distortion function to the user computing device 104 periodically.

The user computing device 104 applies the distortion function to the collected reference user authentication data 126 before sending them to the authentication system 120. If the reference user authentication data 126 need to be updated, such as due to a change in the user data (e.g. detecting a new location associated with the user) or a new distortion function is assigned, the user computing device 104 regenerate the reference user authentication data 126 by applying the current distortion function to the collected data. Additional details regarding collecting the reference user authentication data 126 are provided below with respect to FIG. 4.

A user 102 can have multiple user computing devices associated with the user profile, such as a smartphone, a laptop, a desktop associated with the user 102. The reference user authentication data 126 can be collected from any of the user computing devices. These multiple user computing devices can be registered with the authentication system 120 through the key or through a user computing device previously registered and associated with the user profile.

The access control system 108 can determine whether to grant or deny the access request 106 based on the authentication results 128. In some examples, the determination is further made based on qualification data 134 generated by a qualification verification system 130. For example, if the access request 106 is for accessing an online environment that involves payment (e.g. accessing an online store for purchasing a product or a service), the qualification verification system 130 represents a payment processing system that verifies the payment information provided by the user 102 is valid and that the user 102 has enough balance to move forward with the payment. If the access request 106 is for accessing a credit product, the qualification verification system 130 represents a system associated with a credit bureau for providing a credit score of the user 102.

To obtain the qualification data 134 of the user 102, the access control system 108 can generate and submit a qualification request 132 to the secure storage system 110 or to another suitable system. The qualification request 132 can include the user identification information and the permission information contained in the access request 106 and the authentication results 128. The qualification verification system 130 can receive or obtain the qualification request 132. In some examples, the qualification verification system 130 verifies the validity of the qualification request 132. This verification can include, for example, verifying that access control system 108 is the intended recipient of the user identification information, the valid time periods associated with the user identification information and the authentication results 128 have not expired, the maximum number of uses associated with the user identification information or the authentication results 128 has not been reached, and so on. In some examples, the qualification verification system 130 further verifies whether the qualification request 132 is associated with a permissible purpose. For example, if the qualification request 132 is for accessing a user's credit score, the qualification verification system 130 verifies whether the access control system 108 has specified a permissible purpose, such as for employment, credit application, insurance application, and so on.

If the qualification verification system 130 determines that the qualification request 132 is valid, the qualification verification system 130 generates and submits the qualification data 134 to the secure storage system 110. The access control system 108 can retrieve the qualification data 134 and makes the access control decision for the access request 106 based on the qualification data 134 and other factors. Additional details regarding secure access control to prevent identification information misuse are provided below with regard to FIGS. 2-4.

Although not illustrated in FIG. 1, the various data communicated between the various systems of the access control environment 100 can be sent over a network. The network may be a local-area network ("LAN"), a wide-area network ("WAN"), the Internet, or any type of data communications network known in the art that enables communications between the systems in the access control environment 100.

The user computing device 104 may be a personal computer ("PC"), a desktop workstation, a laptop, a notebook, a personal digital assistant ("PDA"), an electronic-book reader, a smartphone, a wearable computing device (such as a smart watch, a smart glass, a virtual reality head-mounted display), a game console, a set-top box, a consumer electronics device, a server computer, or any other computing device capable of collecting reference user authentication data 126 and communicating it through the network. The access control system 108, the authentication system 120, or the qualification verification system 130 may each represent one or more conventional server computers, Web servers, database servers, or network appliances.

Examples of Operations for Secure Resource Management

Figure 2A:
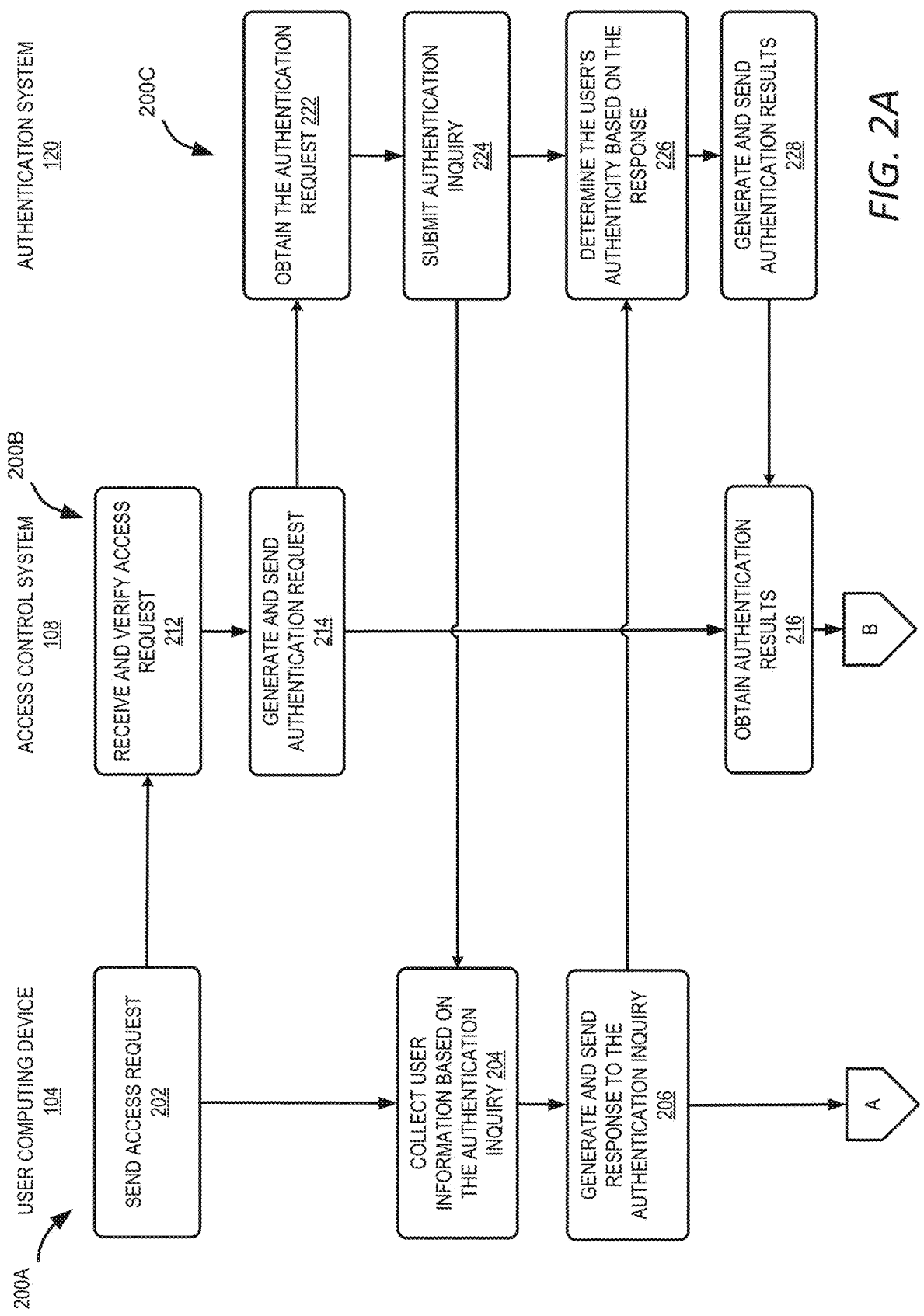
FIGS. 2A and 2B depict a flow chart illustrating an example of a process for performing secure access control to prevent identification information misuse, according to certain aspects of the present disclosure.
Figure 2B:
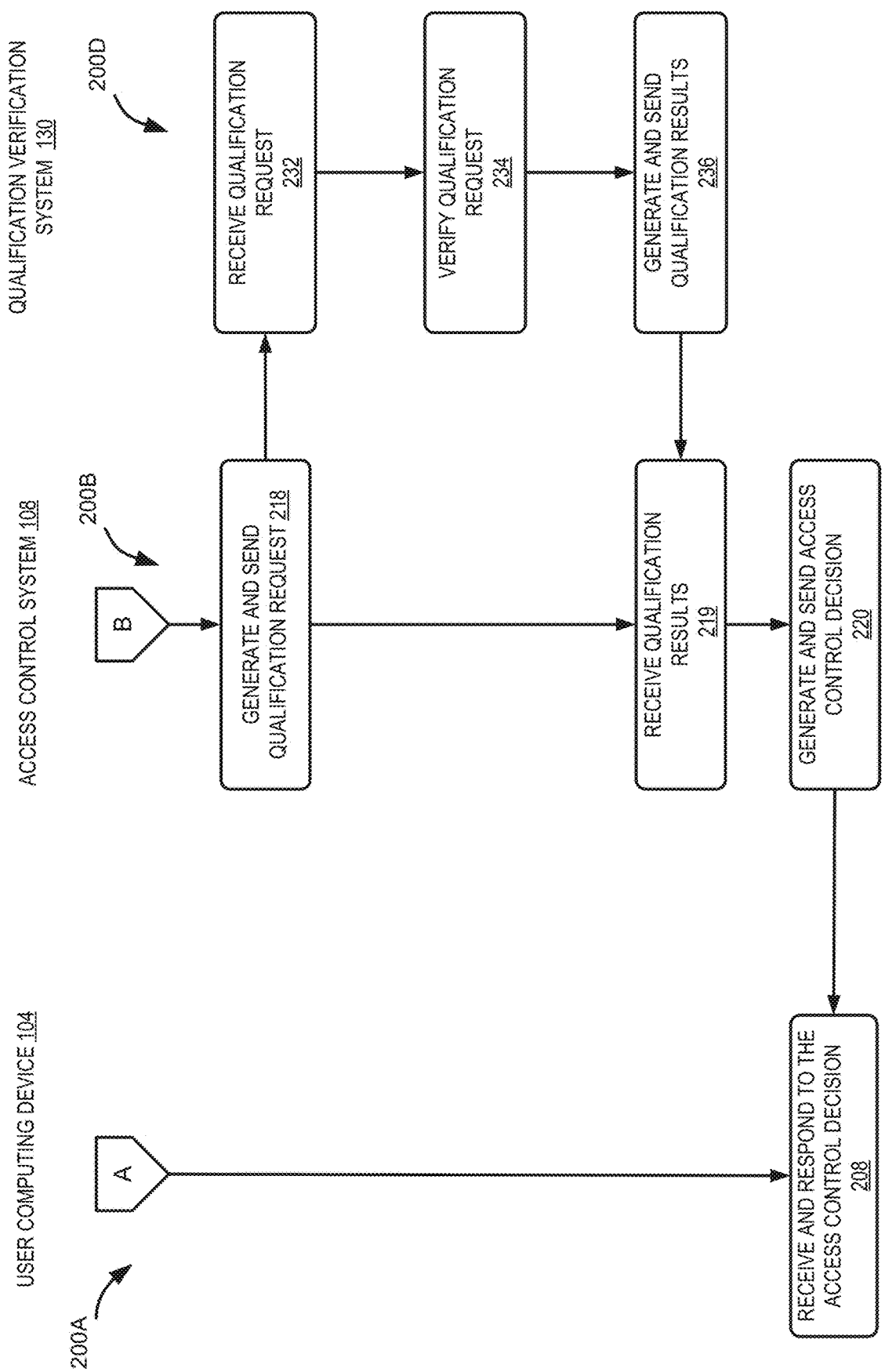

FIGS. 2A and 2B collectively depict examples of processes 200A-200D for performing secure access control to prevent identification information misuse, according to certain aspects of the present disclosure. In particular, the process 200A illustrates aspects of the user computing device 104, the process 200B illustrates aspects of the access control system 108, the process 200C illustrates aspects of the authentication system 120, and the process 200D illustrates aspects of the qualification verification system 130 with regard to the aspects described above with regard to FIG. 1. The processes 200A-200D will be described together below.

In some aspects, one or more of the operations in FIGS. 2A and 2B may be implemented in the respective program code that is executed by one or more of the user computing device 104, the access control system 108, the authentication system 120 and the qualification verification system 130 depicted in FIG. 1. In some aspects of the present disclosure, one or more operations shown in FIGS. 2A and 2B may be omitted or performed in a different order. Similarly, additional operations not shown in FIGS. 2A and 2B may be performed.

At block 202, the process 200A involves sending an access request 106 to request access to a resource. Examples of resources include features of an online computing environment (e.g., an online banking service), a credit product, and so on. In some examples, the access request 106 includes user identification information that uniquely identifies a user 102. The access request 106 may further include permission information that specifies the use permissions of the user identification information. The permission information can include, but is not limited to, the intended recipient and the intended purpose of the user identification information, the valid channel where the user identification information is received, the valid time period during which the user identification information can be used, the maximum number of times that the user identification information can be used, and so on. The permission information thus determines conditions that need to be satisfied in order for the access control system 108 to use the access request 106.

Figure 3:
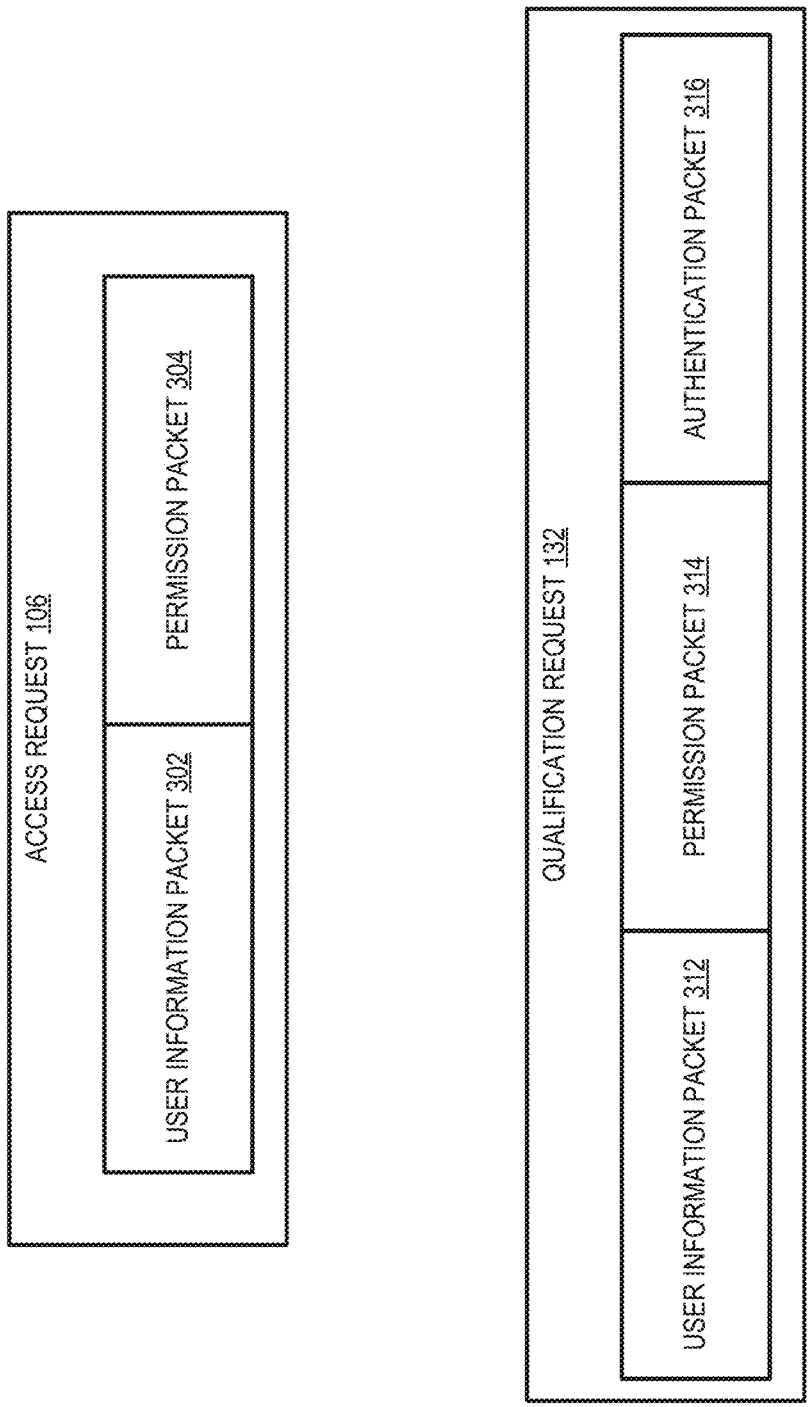
FIG. 3 depicts an example of the content of an access request and an example of the content of a qualification request according to certain aspects of the present disclosure.

FIG. 3 shows an example of the content of an access request 106 according to certain aspects of the present disclosure. The access request 106 is a data structure having one or more packets that are interpretable by one or more computing systems for controlling access to an online environment or service. In this example, the access request 106 includes a user information packet 302 containing the user identification information discussed above and a permission packet 304 containing the permission information discussed above. Both packets are included in the access request 106 transmitted to the access control system 108. In other examples, the access request 106 includes a single packet containing both the user identification information and the permission information. Additional information not illustrated or described above may also be included in the access request 106.

Referring back to FIG. 2, the user computing device 104 sends the access request 106 to the access control system 108 directly or to a secure storage system 110. The secure storage system 110 stores information associated with the access control environment 100 so that the interactions or transactions between the systems in the access control environment 100 are recorded and can be traced back when needed. In some examples, the secure storage system 110 is implemented using a blockchain. In other examples, the secure storage system 110 is implemented using a secure database.

At block 212, the process 200B involves receiving the access request 106 by the access control system 108. Depending on how the access request 106 is sent, the access control system 108 may receive the access request 106 from the user computing device 104 or retrieve the access request 106 from the secure storage system 110. The access control system 108 further verifies the access request 106 by examining the permission packet 304 to determine if the conditions specified by the permissions are satisfied. The conditions can include, for example, that the access control system 108 is an intended recipient of the access request 106, the access request 106 is within the intended purpose and is received through a valid channel, the valid time period has not expired, the maximum number of uses of the access request 106 has not been reached, and so on.

If the conditions are satisfied, the process 200B involves, at block 214, generating and sending an authentication request 112 to have the authentication system 120 to verify the authenticity of the user 102. The authentication request 112 includes an indication that the access control system 108 requests authenticating the user 102. The authentication request 112 can further include the information contained in the access request 106 including the user identification information and the permission information. With the user identification information and the permission information, the authentication system 120 can verify the validity of the authentication request 112. The access control system 108 may send the authentication request 112 directly to the authentication system 120 or submits it to the secure storage system 110.

At block 222, the process 200C involves receiving the authentication request 112. Depending on how the authentication request 112 was sent, the authentication system 120 may receive the authentication request 112 directly from the access control system 108 or obtain it from the secure storage system 110. As discussed above, the authentication request 112 may include the user identification information that identifies the user 102 and the permission information that are contained in the access request 106.

At block 224, the process 200C involves generating and submitting authentication inquiries 121 to the user computing device 104. The authentication inquiries 121 specify the user authentication data 122 that need to be provided by the user 102. For example, the authentication inquiries 121 may be presented as a web page containing different fields for the user to input the user authentication data 122.

At block 204, the process 200A involves collecting the user authentication data 122 based on the authentication inquiries 121. For example, the user can provide a live image of the user's face using the camera of the user computing device 104, provide keystroke patterns by typing in a string of text using the user computing device 104, provide the fingerprint of the user 102 through a fingerprint reader attached to the user computing device 104, enter the picture pass by clicking on a set of pre-defined points on a given image, and so on.

At block 206, the process 200A involves generating and sending the collected authentication data to the authentication system 120. As discussed briefly above with respect to FIG. 1, the user computing device 104 may apply a distortion function on the collected authentication data and send the distorted authentication data to the authentication system 120. In some examples, the distortion function is a one-way function, such as a hash function, that is applied to the collected authentication data. In some implementations, the distortion function is applied to the biometrics of the user 102. In other implementations, the distortion function is applied to other data of the authentication data as well.

The distortion function is assigned to the user computing device 104 by the authentication system 120. In some examples, the authentication system 120 updates the distortion function of the user computing device 104 from time to time to increase the security. Assigning the distortion function can be performed by the authentication system 120 sending the distortion function to the user computing device 104 during the registration process or any time period after the registration. In another example, instead of sending the distortion function, the authentication system 120 can install the distortion function at the user computing device 104 during registration and updates a cryptography key used by the distortion function from time to time. Other ways of sending and updating the distortion function can also be employed.

To further increase the security of the authentication mechanism, the distortion function assigned to each user computing device 104 is unique to that device. In addition, the distortion function can also be made unique to a combination of the user computing device 104 and the way that the user 102 interacts with the authentication system 120, such as through an authentication application, a webpage or a service call. For instance, the authentication system 120 can use an identifier (e.g. the serial number) of the user computing device 104 to generate the cryptography key for the distortion function to make the distortion function unique to the user computing device 104. Likewise, the identifier of the user computing device 104 and an identifier of the way through that the user computing device 104 interacts with the authentication system 120 can be combined and utilized to generate the cryptography key for the distortion function. The distorted user authentication data 122 is sent to the authentication system 120 either directly or through the secure storage system 110 as the responses to the authentication inquiries 121.

At block 226, the authentication system 120 obtains the user authentication data 122 and determining the authenticity of the user 102 based on the user authentication data 122. In some examples, the determination is performed by comparing the received user authentication data 122 with the reference user authentication data 126 stored in the authentication data repository 124. If there is a match between the received user authentication data 122 and the reference user authentication data 126, the authentication system 120 can determine that the user 102 is the owner of the user identification information contained in the authentication request 112. Otherwise, the authentication system 120 can determine that the user 102 is not the authentic owner of the user identification information.

In some examples, the authentication system 120 determines there is a match between the user authentication data 122 and the reference user authentication data 126 if all the data contained in the user authentication data 122 match the corresponding data in the reference user authentication data 126. For example, if the user authentication data 122 contains five data points (e.g. a face image, a keystroke pattern, a picture pass, an answer to a secret question, a location of the user computing device), a match is found if the five data points are the same as the corresponding five data points stored in the reference user authentication data 126.

In other examples, a match is found if more than N data points are the same. Continuing the above example, if N (N≤5) out of the five data points in the user authentication data 122 are the same as the corresponding data points in the reference user authentication data 126, the authentication system 120 can declare a match and thus determine that the user 102 is the owner of the user identification information. In some implementations, N is chosen to be close to the total number of data points to enforce a higher degree of match. The unmatched data points can be tracked and be added to the reference user authentication data 126 if they are observed repeatedly. For instance, the unmatched data point could be the location of the user computing device because the user 102 has taken the user computing device 104 to a new location. If the new location is observed frequently by the authentication system 120, the authentication system 120 can add the new location to the reference user authentication data 126 so that the new location can be counted as a match in the future.

At block 228, the process 200C involves generating the authentication results 128. In some examples, the authentication results 128 include an indication that the user 102 is or is not the owner of the user identification information, and the permission of use of the authentication results. The permission of use of the authentication results 128 can be set to be the same as the permission of use of the user identification information. For example, the intended recipient and purpose of the authentication results 128 can be set to the intended recipient and purpose of the user identification information contained in the access request 106. Similarly, the authentication results 128 can be set to expire as the access request 106 expires. In other examples, the permission of use of the authentication results 128 can be different from that of the access request 106. The authentication system 120 transmits the authentication results 128 to the access control system 108 directly or through the secure storage system 110.

At block 216, the process 200B involves obtaining the authentication results 128, for example, from the secure storage system 110 and making determinations based on the authentication results 128. If the authentication results 128 indicate that the user is not the owner of the user identification information, the access control system 108 may determine to deny the access request 106. If the authentication results 128 indicates that the user 102 is authentic and may determine to further evaluate the user 102 for granting access to resources.

In some scenarios, additional information regarding the user is collected for making the access control decision. For example, if the access request 106 is an application for a credit product, the credit score of the user 102 could be needed in order to decide whether to grant the user's application. If the access request 106 involves acquiring a certain product or service, a payment method provided by the user 102 may need to be verified in order to determine whether to approve the acquisition transaction and grant the user's access to the product or service.

At block 218, the process 200B involves generating and sending a qualification request 132 to obtain a qualification of the user 102. In some examples, the qualification request 132 includes the user identification information and permission information in the access request 106. The qualification request 132 can further include the authentication results 128 generated for the user 102.

FIG. 3 also depicts an example of the content of a qualification request according to certain aspects of the present disclosure. In this example, the qualification request 132 includes three packets: a user information packet 312 containing the user identification information specified in the access request 106, and a permission packet 314 containing the permission information specified in the access request 106 and an authentication packet 316 containing the authentication results 128. The user information packet 312 and the permission packet 314 may be the same as the user information packet 302 and the permission packet 304 contained in the access request 106, respectively.

Referring back to FIGS. 2A and 2B, at block 218, the qualification request 132 is sent to a qualification verification system 130. Depending on the type of qualification needed, the qualification verification system 130 may be a credit bureau, a payment processing system or other systems. At block 232, the qualification verification system 130 receives the qualification request 132, either directly from the access control system 108 or through the secure storage system 110.

At block 234, the qualification verification system 130 verifies the qualification request 132 by examining the permission packet 314 and authentication packet 316 to determine if the access control system 108 has the permission to request the qualification of the user 102. The examination can be performed by determining, for example, if the access control system 108 is the intended recipient of the user identification information, if the requested qualification is for the intended purpose, if the user identification information has not expired, or if the authentication results have not expired. If so, the qualification verification system 130 can determine that the qualification request 132 is a valid request. Otherwise, the qualification verification system 130 can deny the qualification request 132.

At block 236, the qualification verification system 130 generates the qualification data 134 for the user 102 as requested and returns the qualification data 134 to the access control system 108. At block 219, the access control system 108 obtains the qualification data 134 and determines whether to grant the user's access to the resources. At block 220, the access control system 108 generates the access control decision that can be a grant of the access request 106 or a denial of the access request 106. The access control decision is further sent to the user computing device 104. At block 208, the user computing device 104 receives the access control decision and acts accordingly, such as accepting or denying the grant if the access control decision contains a grant to the access request 106.

Figure 4:
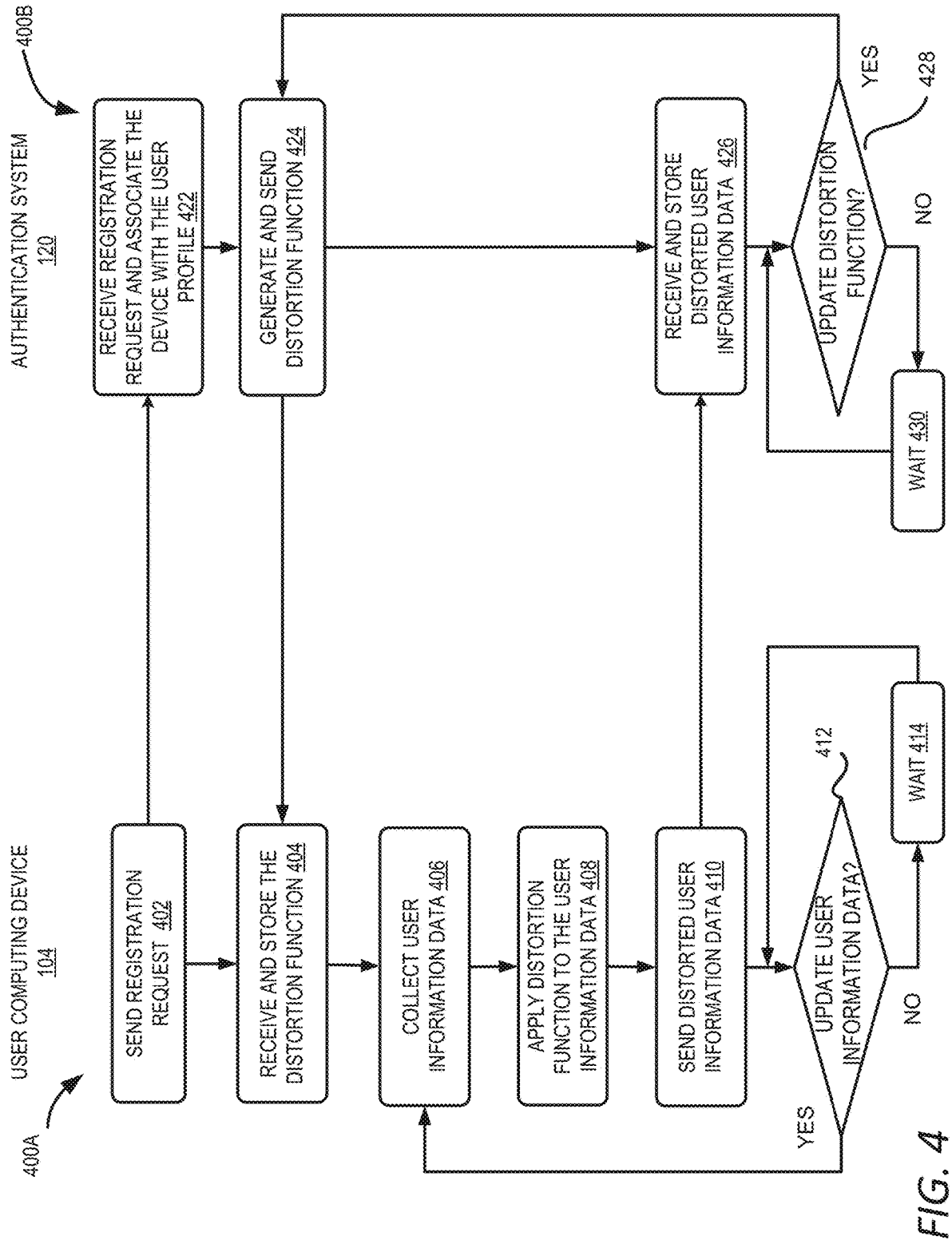
FIG. 4 depicts a flow chart illustrating an example of a process for obtaining reference user authentication data from a user computing device, according to certain aspects of the present disclosure.

FIG. 4 depicts illustrating examples of processes 400A and 400B for obtaining reference user authentication data 126 from a user computing device 104, according to certain aspects of the present disclosure. In particular, the process 400A illustrates aspects of the user computing device 104 and the process 400B illustrates aspects of the authentication system 120 with regard to the aspects described above with regard to FIG. 1. The processes 400A and 400B will be described together below.

In some aspects, the operations in FIG. 4 may be implemented in the respective program code that is executed by the user computing device 104 and the authentication system 120 depicted in FIG. 1. In some aspects of the present disclosure, one or more operations shown in FIG. 4 may be omitted or performed in a different order. Similarly, additional operations not shown in FIG. 4 may be performed.

At block 402, the process 400A involves sending a registration request to the authentication system 120. The registration request might be generated by the user computing device 104 through scanning a key, such as a QR code, associated with the user's profile. The registration request may be transmitted directly to the authentication system 120 or through the secure storage system 110. At block 422, the process 400B involves receiving the registration request and associates the user computing device 104 with the profile of user 102.

At block 424, the process 400B involves generating and sending a distortion function to the user computing device 104. The distortion function can be utilized by the user computing device 104 to apply distortion to the user authentication data, especially the user's biometrics, before sending them to the authentication system 120. As discussed above, in some examples, the distortion function is unique to the user computing device 104 or a combination of the user computing device 104 and the way the user computing device 104 interacts with the authentication system 120. The distortion function can be sent along with an authentication application to be installed on the user computing device 104 for collecting reference user authentication data 126.

At block 404, the user computing device 104 receives and stores the distortion function and the authentication application. At block 406, the user computing device 104 executes the authentication application and collects reference user authentication data 126 as instructed by the authentication application. For example, the authentication application may request the user to input biometrics, such as a face image, a fingerprint, or a keystroke pattern. The authentication application may further detect and collect the device information, such as the type of the device, the location of the device, the MAC address, the IP address, and so on. The authentication application may also request the user input information about his knowledge, such as a picture pass, an answer to a secret question, etc.

At block 408, the user computing device 104 applies the distortion function on the collected user information to generate the reference user authentication data 126. At block 410, the reference user authentication data 126 is sent to the authentication system 120. At block 426, the authentication system 120 receives and stores the reference user authentication data 126 in the authentication data repository 124. At block 428, the authentication system 120 determines if the distortion function should be updated. In some examples, the distortion function is updated periodically to increase the security of the system. In these examples, the authentication system 120 can examine if the time to update the distortion function has arrived. If so, the authentication system 120 can generate and send, at block 424, a new distortion function to the user computing device 104. If not, the authentication system 120 can wait for a period of time at block 430 before determining whether to update the distortion function again.

If the user computing device 104 receives a new distortion function, the user computing device 104 can perform the operations in blocks 404 to 410 again with the new distortion function. In some examples, the operation in block 406 is skipped so that the new distortion function is applied to the raw user information data collected previously to generate the updated reference user authentication data 126.

At block 412, the user computing device 104 determines whether the reference user authentication data 126 should be updated. For example, the user computing device 104 may determine that the reference user authentication data 126 need to be updated if the authentication application on the user computing device 104 detects that the user computing device 104 has moved to a different location, is assigned a new IP address, or is associated with other changes that may impact the user information data. In that case, the user computing device 104 performs the operations in blocks 406-410 to generate the updated reference user authentication data 126. If no changes need to be updated, the user computing device 104 can wait for a period of time and then determine again if the reference user authentication data 126 needs to be updated.

Although the above disclosure describes the access request 106 being processed by one access control system 108, the access request 106 may specify multiple access control systems for determining whether to grant access to the respective resource managed by the multiple access control systems. For example, the user computing device 104 can generate an access request 106 specifying multiple access control systems as the intended recipient, such as multiple banks or financial institutions that offer credit products. These multiple access control systems can each perform the operations as described above to determine whether to grant the request to access the resource.

In addition, instead of the access control system 108 requesting the authentication results 128 and the qualification data 134, the user 102 can, through the user computing device 104, request the authentication system 120 to generate the authentication results 128 and request the qualification verification system 130 to generate the qualification data 134. The user computing device 104 can attach the authentication results 128 and the qualification data 134 in the access request 106. Each of the access control systems can make a decision on whether to grant the access request 106 based on the data being provided in the access request 106 without communicating with the authentication system 120 or the qualification verification system 130. In further examples, the interactions between the systems in the operating environment 100 are recorded on the secure storage system 110. The access control system 108 can further verify the authentication results 128 and the qualification data 134 included in the access request 106 using the secure storage system 110 to prevent fraud.

Example of Computing System for Implementing Certain Aspects

Figure 5:
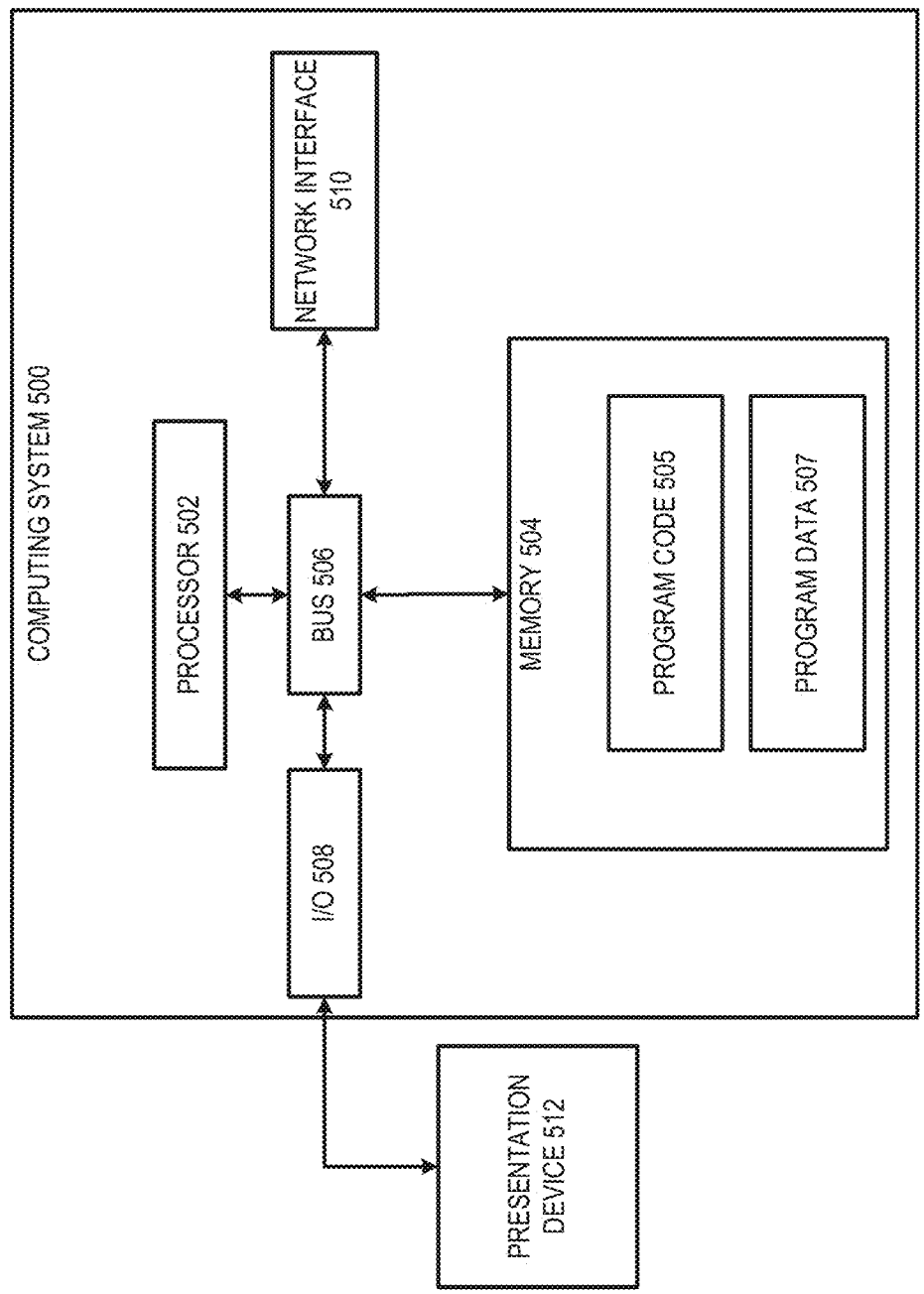
FIG. 5 depicts a block diagram illustrating an example of a computing system suitable for implementing aspects of the techniques and technologies presented herein.

Any suitable computing system or group of computing systems can be used to perform the operations for the secure access control described herein. For example, FIG. 5 is a block diagram depicting an example of a computing device 500, which can be used to implement the user computing device 104, access control system 108, authentication system 120 or the qualification verification system 130. The computing device 500 can include various devices for communicating with other devices in the operating environment 100, as described with respect to FIG. 1. The computing device 500 can include various devices for performing one or more secure access control operations described above with respect to FIGS. 1-4.

The computing device 500 can include a processor 502 that is communicatively coupled to a memory 504. The processor 502 executes computer-executable program code stored in the memory 504, accesses information stored in the memory 504, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 502 include a microprocessor, an application-specific integrated circuit, a field-programmable gate array, or any other suitable processing device. The processor 502 can include any number of processing devices, including one. The processor 502 can include or communicate with a memory 504. The memory 504 stores program code that, when executed by the processor 502, causes the processor to perform the operations described in this disclosure.

The memory 504 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, ROM, RAM, an ASIC, magnetic storage, or any other medium from that a computer processor can read and execute program code. The program code may include processor-specific program code generated by a compiler or an interpreter from code written in any suitable computer-programming language. Examples of suitable programming language include Hadoop, C, C++, C#, Visual Basic, Java, Scala, Python, Perl, JavaScript, ActionScript, etc.

The computing device 500 may also include a number of external or internal devices such as input or output devices. For example, the computing device 500 is shown with an input/output interface 508 that can receive input from input devices or provide output to output devices. A bus 506 can also be included in the computing device 500. The bus 506 can communicatively couple one or more components of the computing device 500.

The computing device 500 can execute program code 505 such as the code for authenticating a user, or the code for determining the access control decision. The program code 505 may be resident in any suitable computer-readable medium and may be executed on any suitable processing device. For example, as depicted in FIG. 5, the program code 505 can reside in the memory 504 at the computing device 500 along with the program data 507 associated with the program code 505, such as the calculated attribute values, the resource allocation plan, or the generated recommendations. Executing the program code 505 can configure the processor 502 to perform the operations described herein.

In some aspects, the computing device 500 can include one or more output devices. One example of an output device is the network interface device 510 depicted in FIG. 5. A network interface device 510 can include any device or group of devices suitable for establishing a wired or wireless data connection to one or more data networks described herein. Non-limiting examples of the network interface device 510 include an Ethernet network adapter, a modem, etc.

Another example of an output device is the presentation device 512 depicted in FIG. 5. A presentation device 512 can include any device or group of devices suitable for providing visual, auditory, or other suitable sensory output. Non-limiting examples of the presentation device 512 include a touchscreen, a monitor, a speaker, a separate mobile computing device, etc. In some aspects, the presentation device 512 can include a remote client-computing device that communicates with the computing device 500 using one or more data networks described herein. In other aspects, the presentation device 512 can be omitted.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification that terms such as "processing," "computing," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "adapted to" or "configured to" herein is meant as an open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

What is claimed is:

1. A method comprising:
    maintaining, at an authentication system, a data repository of reference user authentication data associated with a plurality of users;
    receiving, at the authentication system, distorted user information as the reference user authentication data associated with a user of the plurality of users generated at a user computing device by applying a distortion function to user information of the user obtained by the user computing device associated with the user, wherein the distortion function is unique to the user computing device;
    obtaining, at the authentication system from a secure storage system via a network, an authentication request for authenticating the user from the plurality of users, wherein the authentication request is submitted to the secure storage system by an access control system;
    responsive to obtaining the authentication request, generating and submitting, by the authentication system, authentication inquiries to the secure storage system, wherein the authentication inquiries are retrievable from the secure storage system by the user computing device associated with the user;
    receiving, at the authentication system from the secure storage system, responses to the authentication inquiries generated by the user computing device;
    generating, at the authentication system, authentication results based on the responses to the authentication inquiries and the reference user authentication data associated with the user; and
    transmitting, from the authentication system, the authentication results to the secure storage system over the network that is accessible by the access control system, wherein the authentication results are usable to control an access of the user computing device to a resource.

2. The method of claim 1, further comprising:
    prior to submitting the authentication inquiries to the user computing device through the secure storage system,
    receiving, at the authentication system, a registration request from the user computing device associated with the user;
    sending, from the authentication system, the distortion function to the user computing device;
    receiving, at the authentication system, the distorted user information generated by the user computing device applying the distortion function to the user information obtained by the user computing device; and
    storing, at the authentication system, the distorted user information as the reference user authentication data associated with the user in the data repository.

3. The method of claim 2, wherein the user information associated with the user comprises one or more of biometrics of the user, keystroke patterns of the user, a picture pass selected by the user, devices associated with the user, or a location associated with the user.

4. The method of claim 2, further comprising:
    determining, at the authentication system, that the distortion function for the user computing device is to be updated; and
    sending, from the authentication system, an updated distortion function to the user computing device to replace the distortion function for the user that is stored on the user computing device.

5. The method of claim 4, wherein determining that the distortion function is to be updated comprises determining that a time interval for updating the distortion function has reached.

6. The method of claim 1, wherein the authentication request is submitted to the secure storage system by the access control system based on determining that an access request submitted by the user computing device is valid according to permission information in the access request.

7. The method of claim 1, wherein the secure storage system comprises a block.

8. A non-transitory computer-readable storage medium having program code that is executable by a processor device to cause a computing device to perform operations, the operations comprising:
    maintaining, at an authentication system, a data repository of reference user authentication data associated with a plurality of users;
    receiving, at the authentication system, distorted user information as the reference user authentication data associated with a user of the plurality of users generated at a user computing device by applying a distortion function to user information of the user obtained by the user computing device associated with the user, wherein the distortion function is unique to the user computing device;
    obtaining, at the authentication system from a secure storage system via a network, an authentication request for authenticating the user from the plurality of users, wherein the authentication request is submitted to the secure storage system by an access control system;
    responsive to obtaining the authentication request, generating and submitting, by the authentication system, authentication inquiries to the secure storage system, wherein the authentication inquiries are retrievable from the secure storage system by the user computing device associated with the user;
    receiving, at the authentication system from the secure storage system, responses to the authentication inquiries generated by the user computing device;

generating, at the authentication system, authentication results based on the responses to the authentication inquiries and the reference user authentication data associated with the user; and transmitting, from the authentication system, the authentication results to the secure storage system over the network that is accessible by the access control system, wherein the authentication results are usable to control an access of the user computing device to a resource.

9. The non-transitory computer-readable storage medium of claim 8, wherein the operations further comprise:
prior to submitting the authentication inquiries to the user computing device through the secure storage system,
receiving, at the authentication system, a registration request from the user computing device associated with the user;
sending, from the authentication system, the distortion function to the user computing device;
receiving, at the authentication system, the distorted user information generated by the user computing device applying the distortion function to the user information obtained by the user computing device; and
storing, at the authentication system, the distorted user information as the reference user authentication data associated with the user in the data repository.

10. The non-transitory computer-readable storage medium of claim 9, wherein the user information associated with the user comprises one or more of biometrics of the user, keystroke patterns of the user, a picture pass selected by the user, devices associated with the user, or a location associated with the user.

11. The non-transitory computer-readable storage medium of claim 9, wherein the operations further comprise:
determining, at the authentication system, that the distortion function for the user computing device is to be updated; and
sending, from the authentication system, an updated distortion function to the user computing device to replace the distortion function for the user that is stored on the user computing device.

12. The non-transitory computer-readable storage medium of claim 11, wherein determining that the distortion function is to be updated comprises determining that a time interval for updating the distortion function has reached.

13. The non-transitory computer-readable storage medium of claim 8, wherein the authentication request is submitted to the secure storage system by the access control system based on determining that an access request submitted by the user computing device is valid according to permission information in the access request.

14. The non-transitory computer-readable storage medium of claim 8, wherein the secure storage system comprises a block chain.

15. A system comprising:
a processor; and
a non-transitory computer-readable storage device comprising instructions that are executable by the processor to cause the system to perform operations comprising:
maintaining, at an authentication system, a data repository of reference user authentication data associated with a plurality of users;
receiving, at the authentication system, distorted user information as the reference user authentication data associated with a user of the plurality of users generated at a user computing device by applying a distortion function to user information of the user obtained by the user computing device associated with the user, wherein the distortion function is unique to the user computing device;
obtaining, at the authentication system from a secure storage system via a network, an authentication request for authenticating the user from the plurality of users, wherein the authentication request is submitted to the secure storage system by an access control system;
responsive to obtaining the authentication request, generating and submitting, by the authentication system, authentication inquiries to the secure storage system, wherein the authentication inquiries are retrievable from the secure storage system by the user computing device associated with the user;
receiving, at the authentication system from the secure storage system, responses to the authentication inquiries generated by the user computing device;
generating, at the authentication system, authentication results based on the responses to the authentication inquiries and the reference user authentication data associated with the user; and
transmitting, from the authentication system, the authentication results to the secure storage system over the network that is accessible by the access control system, wherein the authentication results are usable to control an access of the user computing device to a resource.

16. The system of claim 15, wherein the operations further comprise:
prior to submitting the authentication inquiries to the user computing device through the secure storage system,
receiving, at the authentication system, a registration request from the user computing device associated with the user;
sending, from the authentication system, the distortion function to the user computing device;
receiving, at the authentication system, the distorted user information generated by the user computing device applying the distortion function to the user information obtained by the user computing device; and
storing, at the authentication system, the distorted user information as the reference user authentication data associated with the user in the data repository.

17. The system of claim 16, wherein the user information associated with the user comprises one or more of biometrics of the user, keystroke patterns of the user, a picture pass selected by the user, devices associated with the user, or a location associated with the user.

18. The system of claim 16, wherein the operations further comprise:
determining, at the authentication system, that the distortion function for the user computing device is to be updated; and
sending, from the authentication system, an updated distortion function to the user computing device to replace the distortion function for the user that is stored on the user computing device.

19. The system of claim 18, wherein determining that the distortion function is to be updated comprises determining that a time interval for updating the distortion function has reached.

20. The system of claim 15, wherein the authentication request is submitted to the secure storage system by the access control system based on determining that an access request submitted by the user computing device is valid according to permission information in the access request.

\* \* \* \* \*